Figure 1:
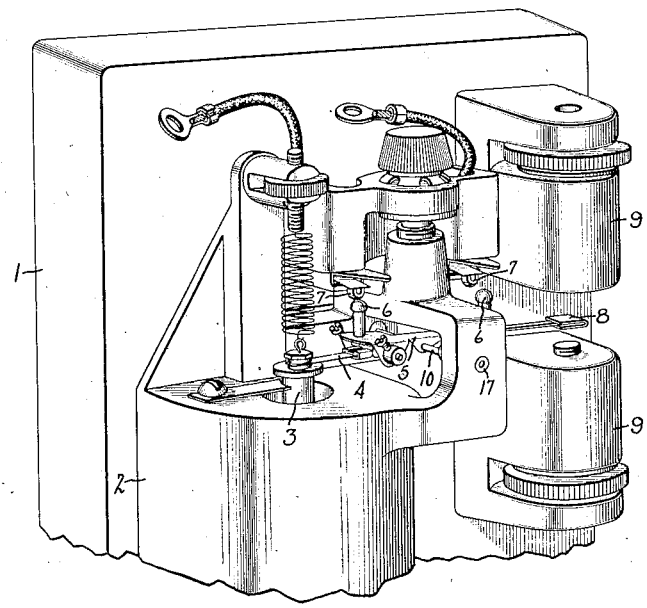

May 5, 1936.   G. H. FAGLEY   2,039,400

BEARING SUPPORT

Filed April 10, 1934

Inventor:
Gilbert H. Fagley,
by Harry E. Dunham
His Attorney.

Patented May 5, 1936

2,039,400

UNITED STATES PATENT OFFICE 2,039,400

BEARING SUPPORT

Gilbert H. Fagley, Pittsfield, Mass., assignor to General Electric Company, a corporation of New York Application April 10, 1934, Serial No. 719,901

2 Claims. (Cl. 308—2)

My invention relates to bearing supports and more particularly to improvements in supporting and mounting means for the end bearings of the pivotally mounted contact beam of contact making voltmeters.

Contact making voltmeters consist essentially of a solenoid operating magnet having a movable core which is connected to operate a pivotally mounted contact beam carrying contacts for cooperation with stationary contacts. The contact beam usually is mounted on a transverse pivot shaft which is set in jeweled end or pivot bearings. It is, of course, desirable to provide means for taking up end play, or lost motion, in the bearings so as to maintain proper alignment of the contacts of the meter and otherwise insure satisfactory operation. However, when the bearings are rigidly mounted in the usual manner and screw threaded take-up means are provided, I have found that due to the temperature changes to which most meters are normally subjected, the expansion of the supports for the meter bearings and also the expansion of the transverse pivot shaft changes the pressure on the pivot in a manner adversely to affect the sensitivity and precision of the meter.

In accordance with my invention, I overcome this difficulty by supporting one of the end bearings by means of a spring which is biased in such a manner as to take up all end play in the bearings and due to its resilience, it gives with thermal expansions and contractions so that the end pressure on the bearings is substantially constant and independent of the temperature to which the meter is subjected.

I have found that by entirely supporting one of the pivot bearings by a spring, instead of supporting the pivot bearings in a cylinder or hole in a supporting bracket and backing the cylinder or bearing with a coil spring which supplies the necessary pressure for taking up lost motion, the operation is much more reliable. This is because if the latter type of construction is employed, it is almost impossible to keep dust and grit out of the hole in which the bearings slide, with the result that the sliding cylinder or cup containing the end bearing is very apt to stick so that the effect of the spring is lost and the end pressure on the bearings will be varied, due to expansion and contraction, with temperature changes.

An object of my invention is to provide a new and improved bearing support.

A further object of my invention is to provide a new and improved spring mounting of the end bearing for the contact beam of contact making voltmeters.

My invention will be better understood from the following description taken in connection with the accompanying drawing, and its scope will be pointed out in the appended claims.

Figure 2:
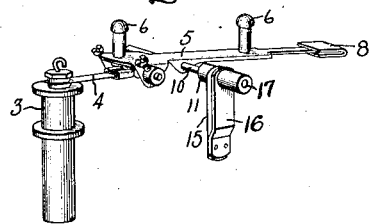
Figure 3:
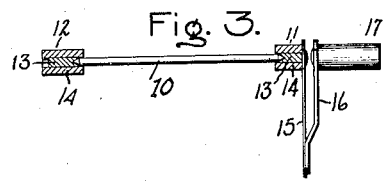

In the drawing, in which like reference characters designate similar parts throughout the several views, Fig. 1 is a perspective view of the upper part of a contact making voltmeter to which my invention is applied, Fig. 2 is a detailed perspective view of the upper part of the solenoid core and the contact beam and showing the details of the spring support for one of the bearings for the contact beam, while Fig. 3 is an enlarged part sectional view of the transverse pivot beam shaft and its bearings and spring supporting means for one of the bearings.

Referring now to the drawing, and more particularly to Fig. 1 thereof, the contact making voltmeter comprises a main supporting member or base plate 1, on which is mounted an enclosed solenoid magnet 2, having a core 3 which is connected by a resilient spring connection 4 to a contact beam 5 carrying movable contacts 6 for cooperation with stationary contacts 7. The contact beam 5 is also provided with a suitable armature member 8 which is adapted to be acted upon by the usual holding coils 9 which are shown enclosed.

As shown more clearly in Figs. 2 and 3, the contact beam 5 is provided with a transverse pivot shaft 10 mounted in end bearings 11 and 12. These bearings may be of any suitable type and as shown they consist of jewels 13 which are mounted in bearing cups or supporting cylinders 14. Bearing 12 may be mounted in any suitable manner, such as in a hole in a bracket carried by the enclosing means for solenoid 2. Bearing 11 is spring mounted and as shown this mounting comprises a flat blade spring 15 extending substantially at right angles to the shaft 10. Any suitable bracket means may be provided for supporting the other end of the spring 15 and as shown, this bracket may consist of a member 16 attached to a cylinder member 17 inserted in a hole in a bracket attached to the enclosing means of the solenoid 2. The holes for supporting bearing 12 and cylinder 17 are shown aligned and consequently can be drilled in one operation. The spring 15 is biased so as to push the bearing 11 toward the bearing 12 and thus take up any end play or lost motion in the bearing. Furthermore, the spring 15 is of sufficient length so that the ordinary motion of the bearing 11, due either to wear in the bearing surfaces or to expansion and contraction, produces an arc of motion of this bearing 11 which is insufficient to disturb the proper alignment of the bearing cylinder. By this construction lost motion in the bearing is eliminated, while at the same time the bearing pressure is substantially independent of temperature changes, and there is no danger of any of the parts sticking or otherwise failing to function.

While I have shown and described a particular embodiment of my invention, it will be obvious to those skilled in the art that changes and modifications may be made without departing from the invention, and I, therefore, aim in the appended claims to cover all such changes and modifications as fall within the true spirit and scope of my invention.

What I claim as new and desire to secure by Letters Patent of the United States, is:

1. In a contact making voltmeter, in combination, a contact beam pivot shaft, a supporting structure having aligned holes, a bearing for one end of said shaft inserted in one of said holes, a member extending laterally with respect to said shaft, means inserted in the other one of said holes for supporting said member, a bearing for the other end of said shaft, and a blade spring fastened to the free end of said laterally extending member for supporting the last mentioned bearing.

2. In a contact making voltmeter, in combination, a contact beam pivot shaft, end bearings for said shaft, supporting cylinders for said bearings, a supporting structure having aligned holes one of which is adapted to receive one of said bearing supporting cylinders, a cylinder inserted in the other of said aligned holes and having a laterally extending member, and a blade spring fastened to the free end of said member for supporting the other bearing supporting cylinder.

GILBERT H. FAGLEY.